No. 613,801. Patented Nov. 8, 1898.
J. R. HUFF.
PRUNING SHEARS.
(Application filed May 23, 1898.)
(No Model.)
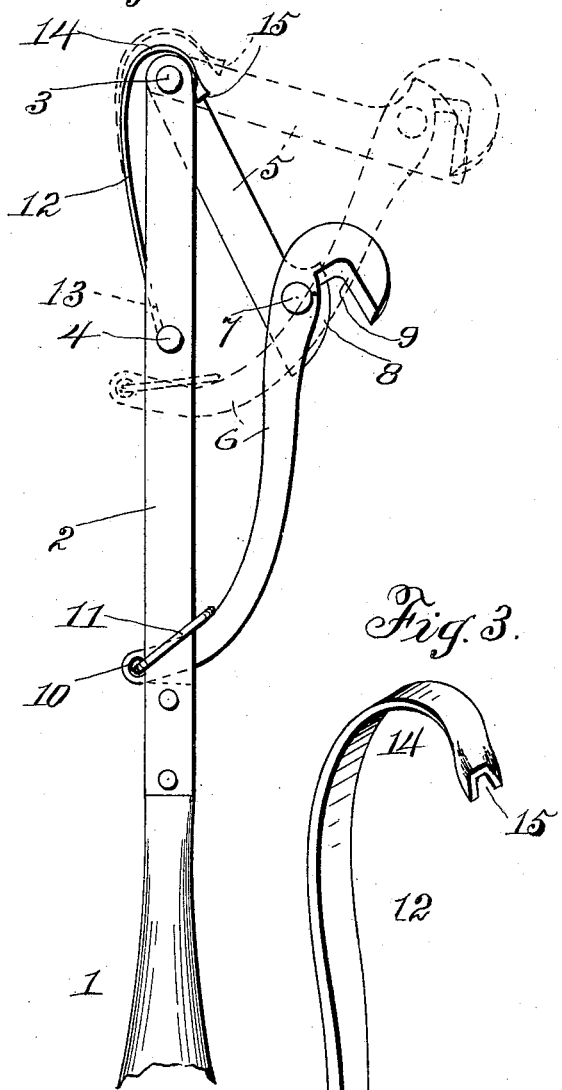
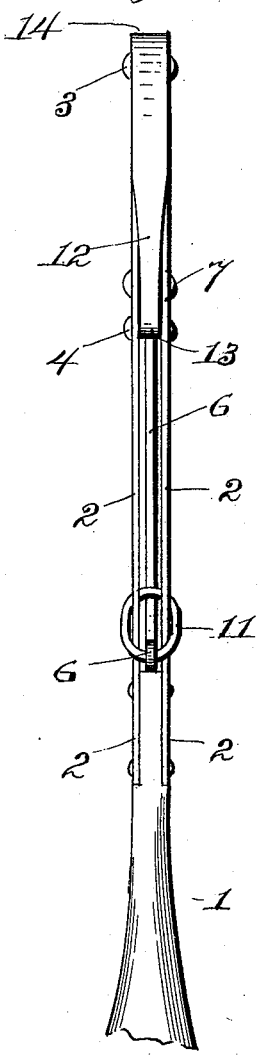
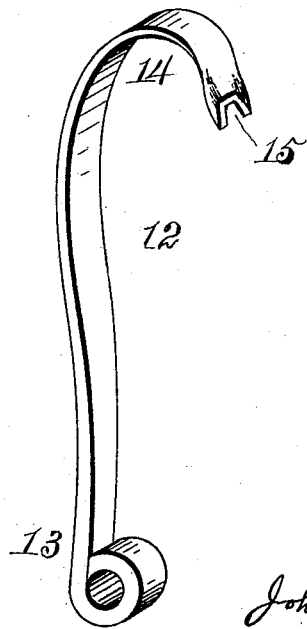
Witnesses.
C. T. Belt,
H. T. Zeigler.
Inventor
John R. Huff,
By W. H. Wills,
Attorney.
THE NORRIS PETERS CO., PHOTO-LITHO., WASHINGTON, D. C.

UNITED STATES PATENT OFFICE.

JOHN R. HUFF, OF CASSVILLE, MISSOURI.

PRUNING-SHEARS.

SPECIFICATION forming part of Letters Patent No. 613,801, dated November 8, 1898.

Application filed May 23, 1898. Serial No. 681,483. (No model.)

*To all whom it may concern:*

Be it known that I, JOHN R. HUFF, a citizen of the United States, residing at Cassville, in the county of Barry and State of Missouri, have invented certain new and useful Improvements in Pruning-Shears, of which the following is a specification.

This invention relates to pruning implements, and particularly to pruning-shears having the cutting ends of the blades pivoted together, the other end of one blade being pivotally fixed and the other end of the other blade being slidably secured to the staff of the implement.

The object of the invention is to provide an improved pruning-shears having novel and peculiar means for connecting the slidable blade to the pruning-staff and a special form of spring bearing on the pivotally-fixed blade to open the blades or return them to normal position.

Other objects, advantages, and improved results are effected by the special construction, arrangement, and combination of parts, as will be disclosed in the specification and claims to follow.

In the accompanying drawings, forming part of this application, Figure 1 is a side view, the dotted lines showing the blades closed. Fig. 2 is a rear edge view. Fig. 3 is a perspective view of the spring.

The same numeral references denote the same parts throughout the several figures of the drawings.

To an ordinary handle 1, which may be any desired length, are secured arms 2, which form the staff of the implement. These arms are secured together, with an interval or space between them, by a bolt 3 at the end and a bolt 4 about midway the length of the arms. The shearing-blade 5 is pivoted at one end between the arms 2 on the bolt 3, and the other end is pivoted to the sliding blade 6 by a pin or rivet 7, thus securing the semicircular cutting end 8 of the blade 5 and the angular hooked cutting end 9 of the blade 6 in proper shearing or cutting position. The free end of the blade 6 extends through and between the arms 2. It has an aperture 10, engaged by a link 11, which extends around the arms and is moved upward by the operator, carrying the free end of the said blade with it to bring the cutting edges of the blades together and effect the shearing. A plate-spring 12, having a tapering thickened end 13, secured to the bolt 4 between the arms 2, increased in width from said end to span the edge of both arms 2 and the intervening space, has a bowed or arched portion 14 over the ends of said arms and a free end terminating in an inner recess or cavity 15, which forms a bearing for the blade 5, so that when the upward pressure upon the link ceases the said spring will open the blades and return them to normal position.

It is obvious that a hand-rod may be attached to the link or to the free end of the blade 6 should a long handle be used.

It will be seen that the operator acts directly upon one blade and the spring directly on the other blade, permitting no lost motion, greatly simplifying the operation of the whole device, giving to the blades great strength and cutting power, and requiring no assistance from the operator to open or return the blades to normal position.

Having thus described my invention, what I claim as new, and desire to secure by Letters Patent, is—

1. In an implement of the character described, the combination of the arms forming a staff, the blades pivoted together, one of which is pivoted to the arms, and the other left free to slide between said arms, means for connecting said slidable blade to the arms, and a spring secured to and between the arms and having its free end bowed over the ends of the arms to engage the said doubly-pivoted blade, as set forth.

2. The combination with the arms secured together with an interval or space between them, and the blades pivoted together, one end of one blade being pivoted to the arms, and one end of the other blade being slidable between the arms, of the link connecting the slidable end to the arms, and the plate-spring having one end secured to and between the arms, and the other end widened and bowed over the arm ends and having a recessed bearing for the doubly-pivoted blade, as set forth.

3. The combination with an implement of the character described, of a plate-spring having a tapered thickened end, an increased-width portion terminating in an arch or bow, and an inner cavity or recess in the other end, as set forth.

In witness whereof I hereunto set my hand in the presence of two witnesses.

JOHN R. HUFF.

Witnesses:
WM. A. WEAR,
J. C. SILLS.